Figure 1:
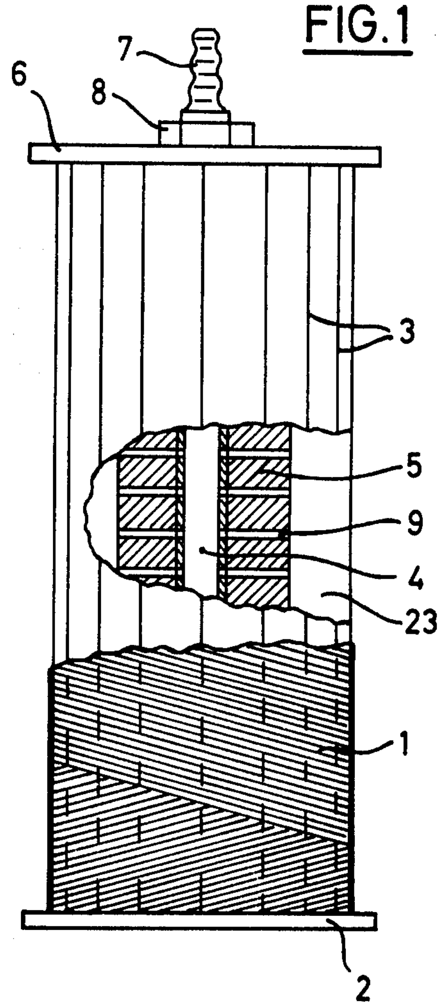

United States Patent [19]

Bruenemann et al.

[11] 4,048,074

[45] Sept. 13, 1977

[54] APPARATUS FOR SEPARATING SOLIDS FROM LIQUIDS OR GAS

[75] Inventors: Hilmar Bruenemann, Ludwigshafen; Guenter Stoeckelmann, Frankenthal, both of Germany

[73] Assignee: BASF Aktiengesellschaft, Ludwigshafen, Germany

[21] Appl. No.: 663,209

[22] Filed: Mar. 2, 1976

[30] Foreign Application Priority Data

Mar. 14, 1975 Germany ............................ 2511195

[51] Int. Cl.[2] ............................................ B01D 33/04

[52] U.S. Cl. ................................. 210/323 T; 55/520; 210/329; 210/387; 210/497.1

[58] Field of Search ................ 55/520; 210/79, 323 T, 210/325, 327, 329, 332, 334, 373, 386, 387, 497.1

[56] References Cited

U.S. PATENT DOCUMENTS

| | | | |
|---|---|---|---|
| 2,426,886 | 9/1947 | Kromline | 210/386 X |
| 3,178,023 | 4/1965 | Wheeler, Jr. | 210/497.1 X |
| 3,224,587 | 12/1965 | Schmidt, Jr. | 210/332 X |
| 3,358,840 | 12/1967 | Pinkava | 210/497.1 |
| 3,525,139 | 8/1970 | Fournier | 210/497.1 X |
| 3,528,555 | 9/1970 | Zievers et al. | 210/387 |

*Primary Examiner*—Thomas G. Wyse
*Assistant Examiner*—Ivars Cintins
*Attorney, Agent, or Firm*—Keil, Thompson & Shurtleff

[57] ABSTRACT

To separate solid particles from liquids or gas, the liquid or the gas is passed through a coil, formed from one or more threads wound on a carrier. After subsequent washing and drying, the solid which has been filtered out during the filtration process is removed by unwinding the coil from the carrier, the latter consisting of a permeable hollow cylinder closed at both end faces by means of end plates, and provided with a feed orifice.

1 Claim, 3 Drawing Figures

7
8
6
3
5
9
4
23
1
2

APPARATUS FOR SEPARATING SOLIDS FROM LIQUIDS OR GAS

The present invention relates to an apparatus for separating solid particles from liquids or gases by means of a filter which consists of an arrangement of superposed threads.

The object of the process of separation generally described as filtration is either to isolate the solid or to obtain a clear filtrate from the material being filtered. Deciding factors in selecting the means of filtration are not only economic considerations but also the physical and chemical properties of the material to be filtered, and the object of the filtration. Most commonly, cloth of natural fibers and synthetic fibers is used in filration technology, especially where granular or coarsely crystalline material is to be filtered off. The particular advantages of filter cloth are its porosity and its adaptability to a great variety of process conditions, eg. by varying the fiber denier, the fiber profile, the weave and the shape of the filter. As a result of using fine fibers, which may, if necessary, additionally be twisted, the efficiency of such filters is very high.

However, the fibrous structure is also responsible for disadvantages which limit the use of this means of filtration. Due to the solid particles being retained by the filter, the pores of the cloth seize up progressively until the entire filter is clogged and can only be regenerated by expensive cleaning processes, it at all. A futher disadvantage is the poor mechanical strength of the cloth.

When separating solids from liquids, the pores become clogged particularly if very fine solid particles are present or, if the solid is of limited solubility in the filtrate, as a result of precipitation occurring in the cloth. Cleaning of the cloth is attempted, eg. in the case of rotary vacuum filters, by passing the cloth coming off the filter into a cleaning bath. However, the guide mechanism for the cloth is of complicated construction and prone to break down. Furthermore, immersion in a bath frequently does not suffice to clean the cloth effectively.

In rotary pressure filters, cleaning agent is sprayed onto the cloth but this frequently results in the cloth being cleaned only superficially, and inadequately. Rapid replacement of the cloth is rarely possible, or is uneconomical, in continuous filters.

It is true that in the case of filter centrifuges changing the filter cloth is simpler but, because of the base layer which builds up, filter centrifuges cannot be used for all filtration tasks. In the most recent developments, with a filter cloth which can be folded over, the problem of compression of the base layer is solved by adopting a rather expensive construction, whilst the problem of clogging of the cloth remains.

In conventional filters such as suction filters or filter presses, the cloth can be changed, or cleaned, manually, but the manual work entailed in emptying and cleaning the apparatus (which is used batchwise), eg. in the manufacture of dyes, is very expensive.

It is an object of the present invention to provide an apparatus by means of which the above disadvantages can be avoided at least partially, but by means of which, above all, clogging of the filter can substantially be prevented or can be overcome more easily.

We have found that this object is achieved by a process in which the liquid to be filtered or the gas to be filtered is passed through a coil formed from one or more threads on a carrier, and the solid deposited on the coil during the filtration process is removed from the coil by unwinding the latter, if appropriate after washing and drying, for which purpose, if necessary, the threads forming the coil are cleaned by mechanical scraping or are passed through baths or nozzles or are freed from solid particles by electrostatic, acoustic or thermal devices, after which the threads are again wound on the carrier.

In order to treat the solids, deposited on the filter, uniformly with wash fluid and/or drying gas, the wash liquid, and the drying gas, flow through the solid, in a further development of the process, through a perforated tube arranged coaxially to the carrier and a perforated cylinder surrounding the tube; furthermore, in order to use the coil uniformly for filtration, the material to be filtered can also be fed to the coil through the tube and the cylinder.

The invention further relates to apparatus for carrying out the process according to the invention, comprising a. a carrier which consists of a permeable hollow cylinder closed at both end faces by means of end plates and provided with a feed orifice on at least one end face, and b. at least one layer of one or more threads wound on the carrier.

If appropriate, the thread or threads are connected to a stock coil and are passed over a thread guide and a winding device.

To clean the threads, an arrangement which, as already described above, may consist of mechanical scrapers and/or baths and/or nozzles and/or electrostatic, acoustic or thermal devices, is located between the carrier and stock coil.

In a preferred embodiment of apparatus according to the invention, a perforated tube of any desired diameter, which can be connected, at least at one end, to a feed line, is located coaxially to the carrier and between the end plates of the latter. In a further embodiment of the apparatus, in order to define the volume of solid which can be taken up within the cavity of the carrier, the perforared tube is surrounded, over its length by a replaceable and perforated cylinder, the perforations of the tube and of the cylinder being aligned.

In a particularly advantageous embodiment of the apparatus according to the invention, a number of filters with coil-to-coil rewinding and cleaning devices are mounted on a support, the individual filters being in engagement with feed lines and discharge lines mounted on a further support, and with the rewinding drive, by means of conventional control heads and couplings which can be undone by relative movement of the two supports.

In an advantageous embodiment of this apparatus, which is to be regarded as a filter unit, several filters are located on a disc which can rotate and are separated from one another by side walls which define segments, and the side walls guide the liquids leaving the filter, and the solids, into the radial orifices of discharge lines which in the particular setting are connected to the segments, and which are arranged centrally and along the periphery of the disc.

The process and apparatus according to the invention permit effective cleaning of the filter without having to interrupt filtration for a prolonged period. The cleaning of individual threads is substantially more thorough than the cleaning of a sheet-like filter which cannot be pulled down. Accordingly, this solves the clogging problem.

In addition, the apparatus according to the invention, and especially the filter unit consisting of a plurality of filters, may be used for automatic operation so that the operatives do not come into contact with potentially noxious materials.

This technical advance offers particular benefits when handling toxic or chemically reactive solids or liquids, as is frequently the case in the chemical industry.

Figure 2:
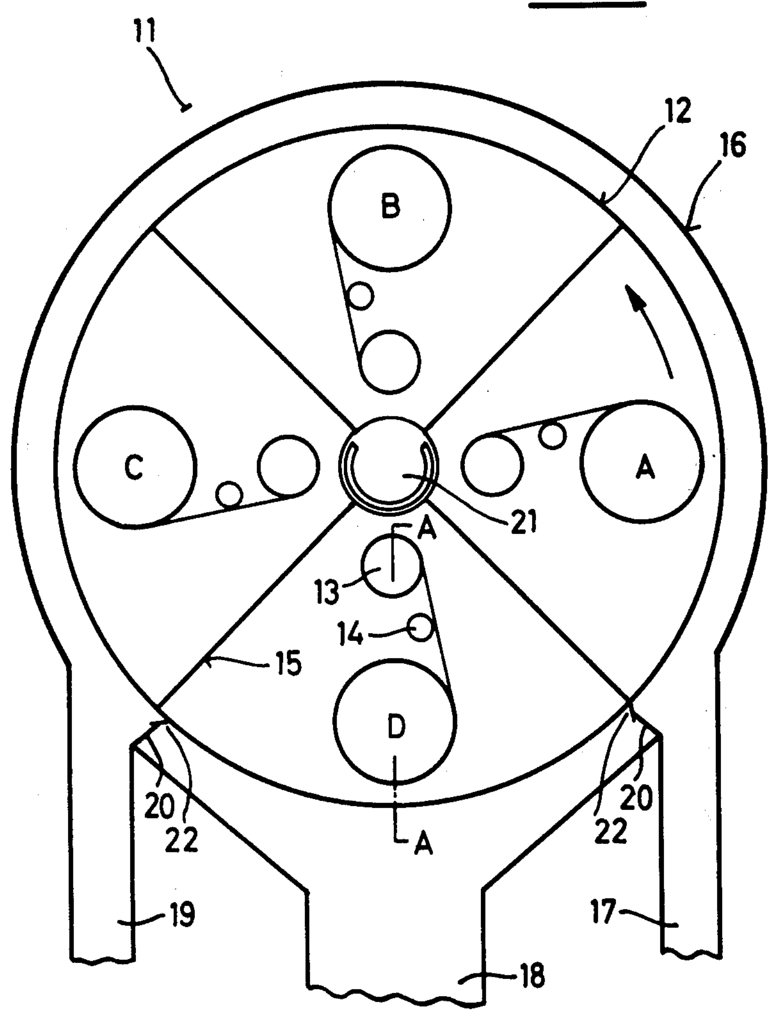
Figure 3:
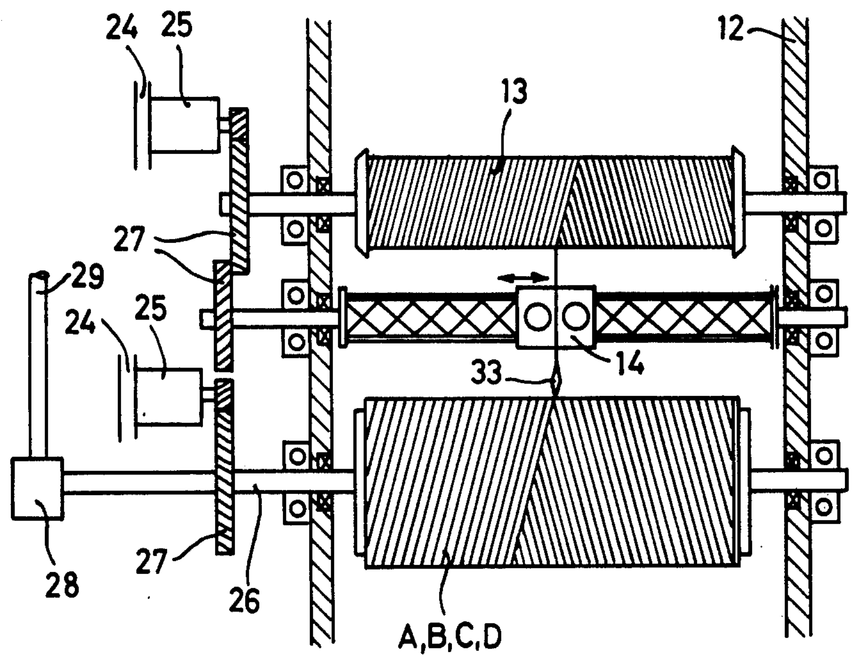

The invention is further illustrated below with reference to the accompanying drawings in which FIGS. 1-3 schematically show the construction of the filter according to the invention.

One or more threads 1 are wound on a metal or plastic carrier 3 consisting of a hollow cage-like cylinder. The thread may be random or arranged systematically, at any desired density. A regular arrangement with very dense winding is preferred, because this requires the least length of thread and permits very fine filtration, without turbidity in the filtrate. To obtain a coil which is as pressure-resistant and stable as possible, the coil is preferably cross-wound in the conventional way. It may be advantageous to wind several layers, simultaneously or successively, with threads of different diameter, profile or surface character, if, eg., a particular penetration profile of the solid is to be achieved.

The winding density, ie. the distance between the threads, is from 10 to 200$\mu$u and preferably from 50 to 80$\mu$u. Depending on the particular filtration problem, from 1 to 100 layers, but for most applications from 5 to 20 layer, are wound on the coil. The thread profile is preferably round and the thread surface is as smooth as possible. For very fine filtration, multifilament threads are preferred, whilst for optimum cleaning of the filter monofilament threads are preferred. Multifilament threads normally have a higher tenacity and therefore permit the use of higher speeds when rewinding the coil. Twisting or braiding of the threads is permissible provided that adequate cleaning of the threads during coil-to-coil rewinding is still possible. Suitable materials are all those which can be converted to continuous filaments, especially polypropylene, polyethylene, nylon, polyacrylonitrile. polyesters and polytetrafluoroethylene, and also metals. In a limited number of cases, threads of natural fibers and synthetic carbon fibers, may also be used.

The thread 1, which is either firmly joined to the carrier 3 or is detachably joined to the carrier by means of conventional catches, is wound on the carrier 3 by means of a winder of the type used in winding solenoids. The end of the thread 1 is fastened to the supply coil 13 (FIG. 3) or to the carrier of another filter. The eyelet 33 of the thread guide 14 (FIG. 3) serves as a mechanical scraper, for cleaning the thread, when unwinding the coil after filtration.

A tube 4, the diameter of which is from about 3 to 5 times smaller than that of the cavity of the carrier 3, is arranged coaxially to the latter. At one end face, the carrier 3 and tube 4 are welded to a circular end plate 2. At the other end, the tube 4 passes through the removable end plate 6 and is provided with a thread, the screw device 8 on the latter serving to press the end plate 6 against the carrier 3. The end of the tube 4 projecting from the end plate 6 is conventionally shaped to provide a hose connection 7. Two half-shells which form a cylinder 5 and rest against the tube 4 are screwed onto the entire length of that part of the tube 4 which runs through the cavity of the carrier 3; the wall thickness of the shells depends on the desired thickness of the filter cake which deposits on the inside of the coil during pressure filtration. It is also possible to push a cylinder, which touches the tube 4 concentrically, over the latter. If this is to be done without removing the feedline from the tube 4, the other end of this tube must be detachable from the end plate, and sealable. In general, the cavity is adjusted so as to accommodate thicknesses of filter cake of from 5 to 20 mm, and preferably from 8 to 15 mm, in order to achieve effective washing and drying of the solid. Numerous radial holes 9 through the cylinder 5 and the tube 4 ensure very uniform distribution of the feed of material to be filtered, of the wash fluid and of the drying gas, over the entire sufface of the filter.

In order to construct a continuously operating filter unit 11, shown schematically in FIG. 2, one filter (A, B, C and D) for each of the process steps of filtration, washing, drying and discharging the solid, whilst cleaning the filter, is located vertically on a rotatably mounted disc 12, together with the corresponding stock coil 13, thread guide 14 and eyelet 33 (the latter being shown only in FIG. 3), which on unwinding the coil serves to scrape residual solid off the thread. If individual process steps are combined, the filter unit can also consist of fewer filters. However, the arrangement described here is the most advantageous and in particular the most compact. To achieve greater filtration capacities, several filters are provided for each of the process steps described above, so that a larger filter area results.

The vertical disc 12 is divided into segments by radial side walls 15 between the individual filters (A, B, C and D). To collect the fulids, a fixed sheet metal collar or plastic collar 16 is provided around the disc 12, the discharge channels 17 and 19 of the collar each being opposite one segment, and the two guide surfaces 20 and the discharge channels 17 and 19, which guide the fluids running off the side walls 15 into the discharge channels 17 and 19, being fixed so that their rubber lips 22, provided as a seal, touch the rim of the disc below the side wall 15. The collecting zone and collecting chute 18 for the solid which drops into the segment which is open at the bottom is located between these two guide surfaces. A fixed collecting channel 21, the aperture of which is thus that the wash liquid can drain off the side walls 15 of the segment above it, into the said channel, leads out of the centre of the disc 12.

In the zone of the segment which is opposite the collecting chute 18, is located the filter, the thread guide 14 and the supply coil 13 and, in front of these, the corresponding drive 25. The extension of the tube 4, constructed as a hollow shaft 26 and protruding axially from the filter, and the axles of the supply coil 13 and of the thread guide mechanism 14 are brought into engagement with the winding drive 25 via friction wheels or gearwheels 27, by turning the disc 12 into the position shown. The extension 26 of the tube 4 of the filter at the same time serves as the feedline for the latter and is connected via a connecting means 28 which provides the transition between it and the non-rotatable portion 29 of the feedline, to a part, firmly fixed to the disc 12, of a control head located centrally behind the disc 12 and comprising a three-way valve of convential construction, with chambers movable relative to one another. This feedline, and the feedlines 29, of identical construction, of the remaining filters, are connected to the control head through the hollow axle of the disc 12.

In this way, the stepwise rotation of the disc 12 results in the material to be filtered, the wash liquid and the drying gas being supplied successively to the individual feedlines.

Where the apparatus according to the invention is used to separate solids from gases which must not be released into the environment, the entire filter unit is accommodated in a gas-tight housing and any gas issuing from the filter is drawn off.

The filter according to the invention can be used for either pressure filtration or vacuum filtration. However, vacuum filtration is less common. For this type of filtration, the entire surface of the filter is dipped into the material to be filtered. By applying a vacuum to the tube 4 located coaxially to the carrier 3, the material to be filtered is sucked from the outside through the thread coil so that the solid is deposited on the outside of the coil. To isolate the solid and regenerate the filter, it suffices to unwind at most the upper 4 layers of the coil. As a result of the thread coil only being unwound partially, it is possible to maintain the vacuum inside the filter whilst isolating the solid and regenerating the filter. To avoid clogging of the filter by solid particles which in the course of time penetrate into the deeper layers of the coil, it is merely necessary to rewind the entire thread coil after a number of filtration runs, this number depending on the degree of penetraion of the solid.

The mode of action of the filter unit described above, when used for pressure filtration, es explained below in relation to the process sequence taking place at the filter A.

The material to be filtered is forced into the cavity 23 of the carrier 3 via the control head 31 and feedlines 26, 28 and 29, through the tube 4, cylinder 5 and radial bores 9. In general, the pressure used is from 0.5 to 20 atmospheres gauge and preferably from 1 to 5 atmospheres gauge. Under the pressure applied, the liquid, referred to as the mother liquor, penetrates through the coil 1, whilst the solid particles which settle in the conventional way on the first turns of the coil form an auxiliary filter layer. The solid remains in the cavity 23 of the carrier 3; the mother liquor runs out through the discharge channel 17. After completion of the filtration, the disc 12 is turned into the position for the next process stage. The segment of the filter A is now above the collecting channel 21, into which the fluid passed through the filter A, for the purpose of washing the filter cake, runs by the same path as the filtrate runs into the channel 17 in the previous stage. Depending on the type of solid concerned, water or a solvent may be used as the wash fluid. The same solvent as that contained in the mother liquor is used frequently. After a further partial rotation, gas, frequently air or nitrogen, is blown through the filter A in order to dry the solid, and leaves the filter unit, together with the residual fluid, through the discharge channel 19. After completion of the drying treatment, and a further partial rotation, the segment of the filter A is above the collecting chute 18 for isolating the solid. The drive 25, which has come into engagement with the filter A, the supply coil 13 and the thread guide mechanism 14, rewinds the thread coil 1 onto the supply coil 13, whilst the eyelet 33 of the thread guide 14 serves as a scraper for cleaning the thread. When the unwinding is complete, the solid, which is now exposed, drops, assisted by the rotation of the filter, out of the filter into the collecting chute 18. However, the solid can also be blown out or flushed out or removed by vibration.

After winding the thread back onto the carrier 3, the filter A is ready to be used for a fresh filtration sequence. As a result of the next partial rotation of the disc 12, the segment of the filter A returns to the starting position of the process.

In another embodiment, a filter unit can be built up of filters according to the invention connected up in parallel, and with this unit the filtration process takes place in the manner described above, but batchwise. Filter units operated in this way provide a large filter area.

Test runs on a trail construction of the apparatus according to the invention indicate that the filtration capacity, in the test run, was about 10 times higher than with conventional filters, though the sharpness of separation of the fluid from the solid was at least equal, this performance being achieved in fully automatic operation.

We claim:

1. A filtration apparatus for separating solid particles from liquids or gases, said apparatus comprising:

a plurality of filter elements separated from each other by side walls which define separate segments of the filter apparatus;

each of said filter elements comprising a permeable hollow cylinder closed at both ends by end plates, at least one of said end plates having a feed orifice provided therein, and at least one layer of threads wound about said cylinder, said thread being connected at one of its ends to a take-up spool through a cleaning means;

a first support means rotatably mounting said filter elements and side walls;

a second fixed support means mounting feed lines and a rewinding drive whereby the relative movement of said first and second support means brings said feed lines and rewinding drive into engagement with said filter elements;

a plurality of separate discharge channels mounted on said second fixed support means, said discharge channels being in communication with each of said filter segments by means of collar mounted about said first rotatable support means and by means of central channel mounted at the axis of rotaion thereof whereby the liquids or solids leaving each of said filter elements are separately channeled away therefrom in accordance with the particular rotational position of said filter elements and filter segments.

* * * * *